United States Patent
Ripley

(10) Patent No.: US 7,013,010 B2
(45) Date of Patent: Mar. 14, 2006

(54) METHOD AND APPARATUS FOR OPTIMALLY FORMATTING MEDIA KEY BLOCKS STORED ON MEDIA WITH HIGH TRANSFER LATENCIES

(75) Inventor: Michael S. Ripley, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 948 days.

(21) Appl. No.: 09/752,545

(22) Filed: Dec. 29, 2000

(65) Prior Publication Data
US 2002/0085715 A1  Jul. 4, 2002

(51) Int. Cl.
*H04N 7/167* (2006.01)
(52) U.S. Cl. .................................. 380/201; 380/277
(58) Field of Classification Search ............... 380/201, 380/228, 277; 713/165; 711/165, 167, 171
See application file for complete search history.

(56) References Cited

U.S. PATENT DOCUMENTS

| | | |
|---|---|---|
| 5,883,958 A * | 3/1999 | Ishiguro et al. ............... 705/57 |
| 6,397,311 B1 * | 5/2002 | Capps ........................ 711/165 |
| 6,609,116 B1 * | 8/2003 | Lotspiech .................... 705/57 |

* cited by examiner

*Primary Examiner*—Gregory Morse
*Assistant Examiner*—Thomas Ho
(74) *Attorney, Agent, or Firm*—Michael R. Barre

(57) ABSTRACT

A method and apparatus to format and process a Media Key Block so as to reduce latencies when processing the Media Key Block. A new record is generated containing header information for the records comprising the Media Key Block. This new record is read just once and allows a device to skip seeking and reading each record header individually. In addition, the records are adjusted so that individual records or individual fields within a record always fit within a single transfer unit.

26 Claims, 11 Drawing Sheets

METHOD AND APPARATUS FOR OPTIMALLY FORMATTING MEDIA KEY BLOCKS STORED ON MEDIA WITH HIGH TRANSFER LATENCIES

FIELD

The present invention relates to a system to minimize user-perceptible latencies when processing encrypted information. More particularly, the invention relates to a method and apparatus to format a Media Key Block so as to reduce latencies when processing the Media Key Block.

BACKGROUND OF THE INVENTION

Increasingly, copyrightable content is being distributed in digital form on various physical media types, including Digital Versatile Disk (DVD). While digital content, such as video and music, has provided greater fidelity to the consumer, it has the significant drawback of being relatively easy to reproduce perfect copies of the content without the authorization of the copyright owner. Because digital content may be copied at any point along the path through which it is transmitted, a number of security measures are usually utilized in combination.

One such security measure revolves around the use of data or content encryption. Generally, digital content is encrypted and then recorded onto a chosen media. A preselected key(s) is then employed by playback devices to decrypt the digital content in order to play it. One drawback with this technology is that once the key(s) has been compromised, unauthorized parties may build devices to copy the decrypted digital content. Said compromised key(s) cannot be revoked without unduly burdening consumers and/or authorized electronic device manufacturers.

An alternative method of digital content protection has been proposed and implemented by an industry organization named the 4C Entity, LLC, which is comprised of International Business Machines Corp., Intel Corp., Matsushita Electric Industries Corp., and Toshiba Corp. The 4C Entity describes their method of content protection in a publication entitled "Content Protection For Recordable Media Specifications" (CPRM), Rev. 0.94, Oct. 18, 2000. CPRM, and its equivalent for pre-recorded media, Content Protection For Pre-Recorded Media (CPPM), define a renewable method for protecting content recorded on a number of physical media types which allows for the revocation or invalidation of any key(s) which may have been compromised. For purposes of this document, all disclosures with respect to CPRM are also understood to apply to CPPM.

Digital content protection under CPRM generally works as follows, although the details may vary among different implementations. The 4C Entity provides one or more secret Device Key(s) to each device manufacturer for inclusion into each CPRM-compliant device produced.

As illustrated in FIG. 1, manufacturers of physical media for digital content place a Media Identifier (MID) 102 and the Media Key Block (MKB) 104, generated by the 4C Entity, on each piece of compliant media 100. In one implementation, the physical media 100 may be a rotational disk, such as a DVD. When compliant media 100 is placed within a compliant drive or player/recorder, a secret Media Key is generated by the device using its Device Key(s) and the MKB 104 stored on the media itself. The same secret Media Key is generated regardless of which compliant device is used to access the media. Content 106 stored on the media 100 is encrypted/decrypted by a Content Key from a one-way function of a secret Title Key and the copy control information (CCI) associated with the content. The Title Key is encrypted and stored on the media using a key derived from a one-way function of the Media Key and MID.

In one implementation, each Device Key has an associated column and row value which relate to the columns and rows of the MKB. For example a Device Key X may be associated with column 4, row 7. For a given device, no two Device Keys have the same associated column value. The number of Device Keys given to each device varies depending on the implementation.

As illustrated in FIG. 2A, the MKB 200 may be formatted as a sequence of contiguous records 204, hereinafter referred to as Media Key Record(s) (MKR). In order to decrypt the digital content, a compliant device uses its Device Key(s) to calculate a Media Key by processing records of the MKB 200 one-by-one, from first to last.

Thus, if a particular Device Key becomes compromised in a way that threatens the integrity of the system, the 4C Entity may "revoke" that Device Key by providing media manufacturers with a new MKB to be stored on new media. The new MKB causes devices with the compromised Device Key to calculate a Media Key which is different than that which is computed by compliant devices, thereby preventing the decryption of the digital content stored on that media. The device may still utilize one of its other Device Keys, if available, to calculate the Media Key that decrypts the digital content.

However, one disadvantage of this security method is the latency caused by reading of the MKB 200. Before playing or accessing the digital content, each compliant device must read the MKB 200 to decrypt the digital content. A MKB 200 can be quite large, typically 3 megabytes (Mbytes) or larger. However, there is no size limit for a MKB per se; the size being merely dictated by the number of Device Keys which have been revoked. In time, the size of a MKB may increase as a result of such revocations. Consequently, the time to process a large MKB 200 can be significant, causing a perceptible nuisance to the user trying to enjoy the content.

In order to appreciate this problem, some additional background information on the MKB 200 is necessary. As illustrated in FIG. 2A, a MKB 200 is comprised of a contiguous sequence of Media Key Records (MKR) 204.

The first record, or MKR, in a MKB 200 is called the Verify Media Key Record 202 and is illustrated in FIG. 2B. This record serves an optimizing function, allowing a device to more quickly terminate the decryption process if the correct Media Key has been calculated. That is, if a particular Device Key and MKR yields a Media Key which satisfies the verifying algorithm, found within the Verification Data field 214, then processing of the MKB 200 may stop and the encrypted data may be decrypted.

Every MKB 200 also has one Calculate Media Key Record (CMKR) 230, illustrated in FIG. 2C. The CMKR 230 is used by the device to calculate a Media Key. The device uses the column and row numbers associated with a particular Device Key to match to the Column field 234 and index to the corresponding Encrypted Key Data field 236, 238, 240, 242, or 244 associated with the row. The Encrypted Key Data field 236, 238, 240, 242, or 244 is employed by the device, in conjunction with its Device Key(s) to calculate a Media Key.

Additionally, the MKB 200 may contain one or more Conditionally Calculate Media Key Records (CCMKR) 250, which is another type of MKR. As illustrated in FIG. 2D, each CCMKR 250 may have a header comprising encrypted information 270, which must be decrypted before processing, and a plurality of doubly Encrypted Key Data fields 272. Like with CMKRs, the device uses an Encrypted Key Data field 260, 262, 264, 266, or 268 in conjunction with Device Key(s) to calculate and update the Media Key.

FIG. 3A illustrates the protocol for accessing a conventional Media Key Record 300. For each MKR 300, a device must first seek and transfer a block containing the record header 302. If the Column field 234 (in FIG. 2C) or 274 (FIG. 2D) of the MKR 300 matches the column value associated with Device Key, then the device must index into the Encrypted Key Data field 304 corresponding to the row associated with the Device Key. Obtaining the Encrypted Key Data 304 may require at least one additional seek and read operation. Thus for each record, at least two read and two seek operations may be required; the first seek and read operations for accessing the MKR header 302 and the second seek and read operations for accessing the Encrypted Key Data 304.

Note that the number of read operations will vary depending on the block size. That is, physical media types may be formatted into different block sizes; the block size being the transfer unit or number of bytes that may be transferred in a single read operation. For DVD-compliant media, the transfer unit is know as known as the Error Control Code (ECC) block; each ECC block comprising 32,768 bytes.

FIG. 3B illustrates another scenario when accessing a Media Key Record 350. In this example, the Encrypted Key Data field 354 spans two blocks 362 and 364. Hence, an additional read operation is required under this circumstance.

Accordingly, there is a need for a system to optimize the processing and/or formatting of a Media Key Block so as to minimize user-perceptible delays.

DETAILED DESCRIPTION OF THE INVENTION

Figure 1:
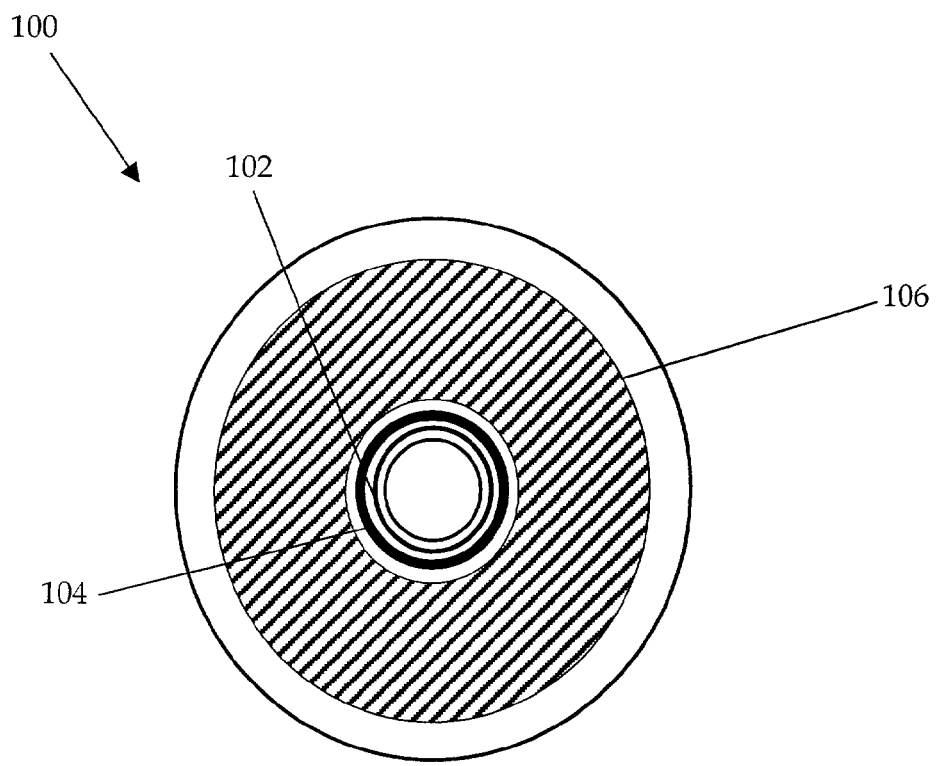
FIG. 1 illustrates a Media Key Block as recorded on a physical media.
Figure 2A:
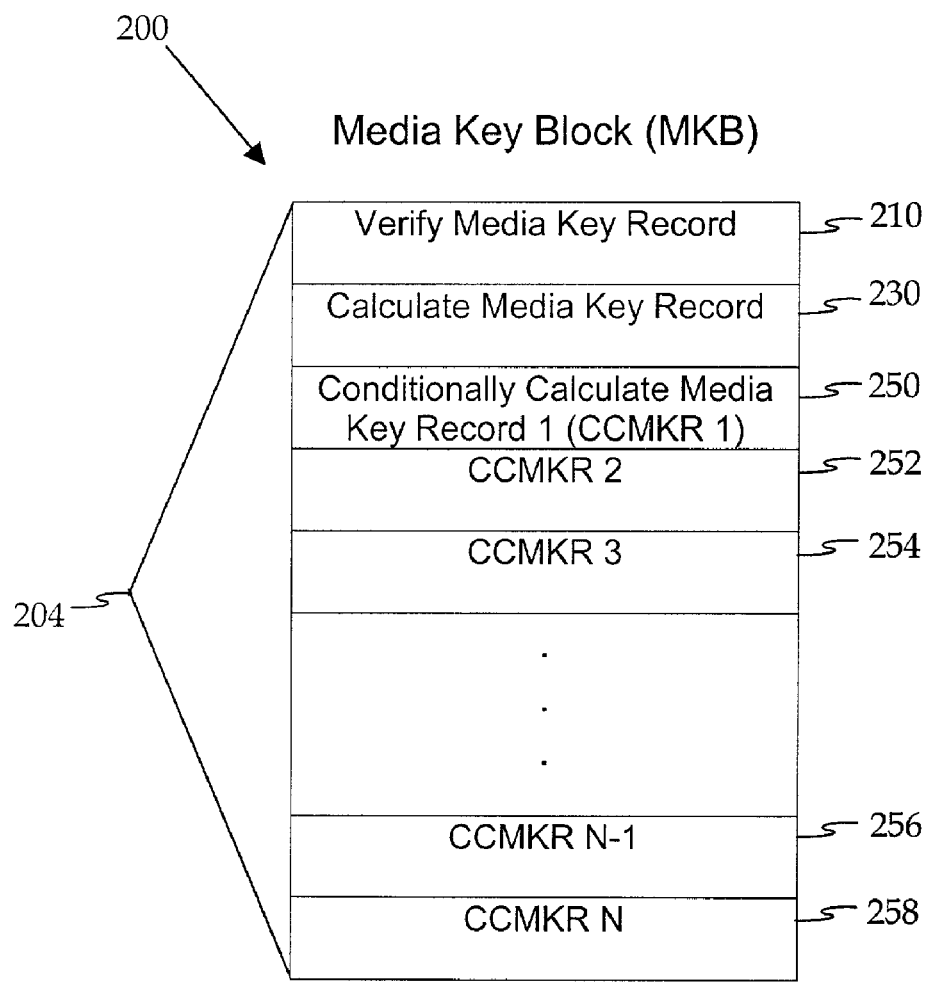
FIG. 2A illustrates one implementation of a Media Key Block.
Figure 2B:
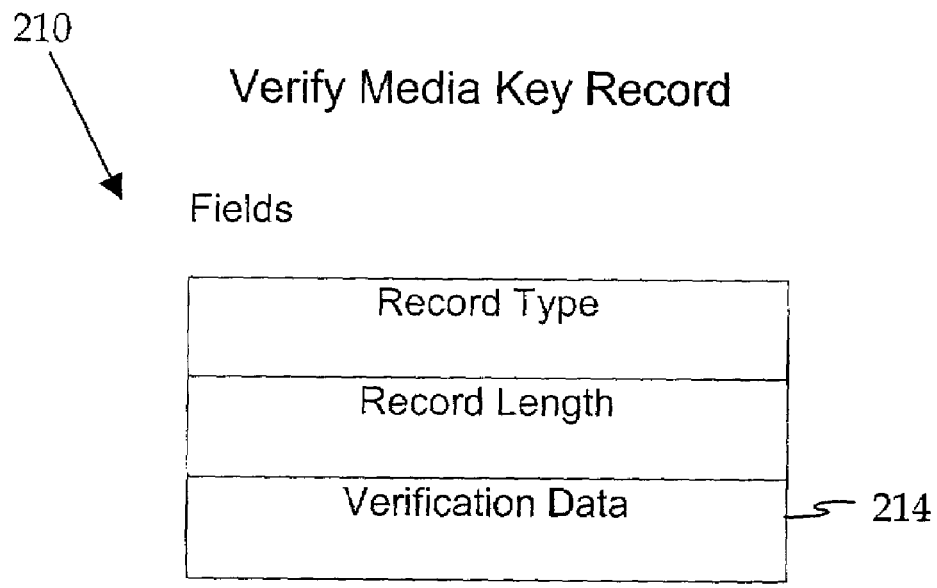
FIG. 2B illustrates one implementation of a Verify Media Key Record within a MKB.
Figure 2C:
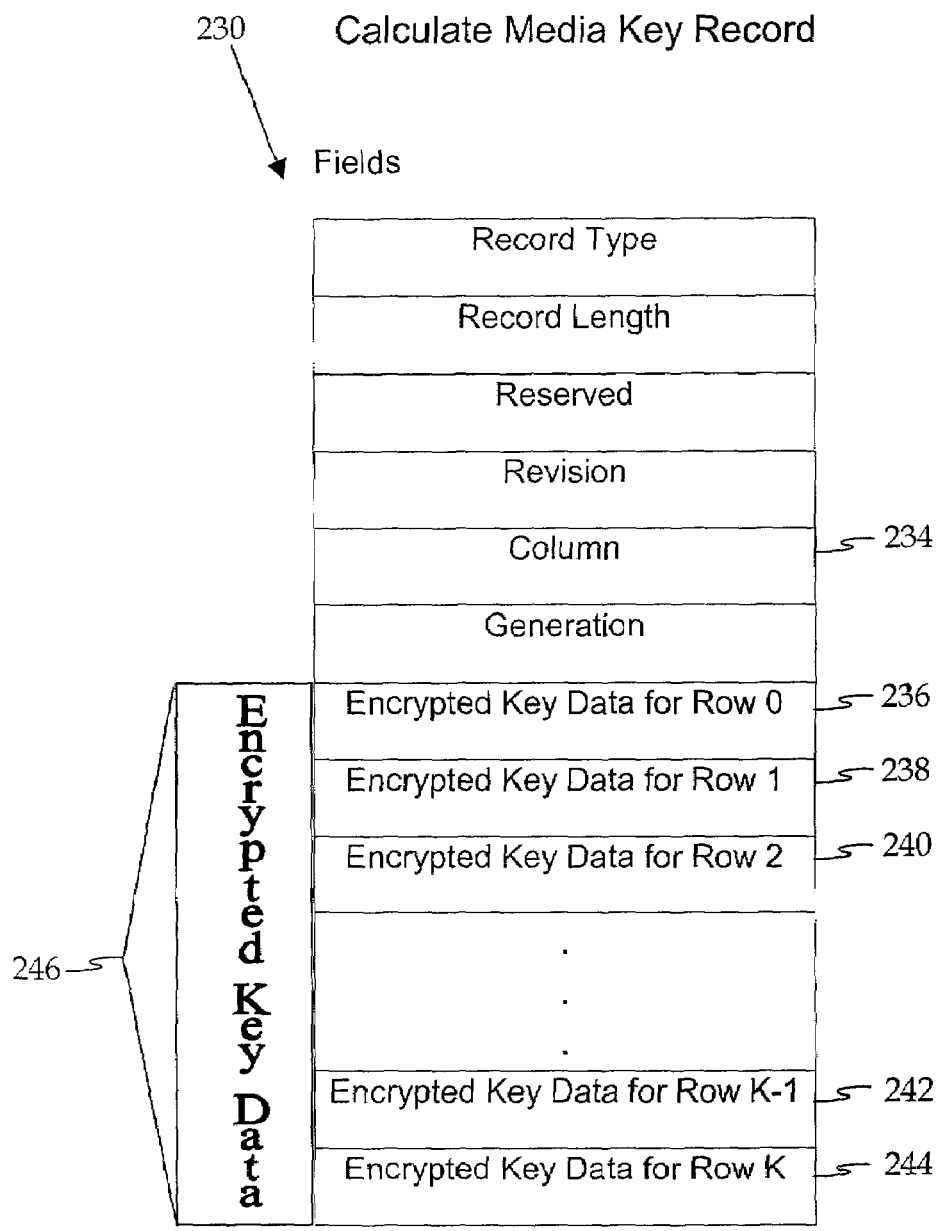
FIG. 2C illustrates one implementation of a Calculate Media Key Record within a MKB.
Figure 2D:
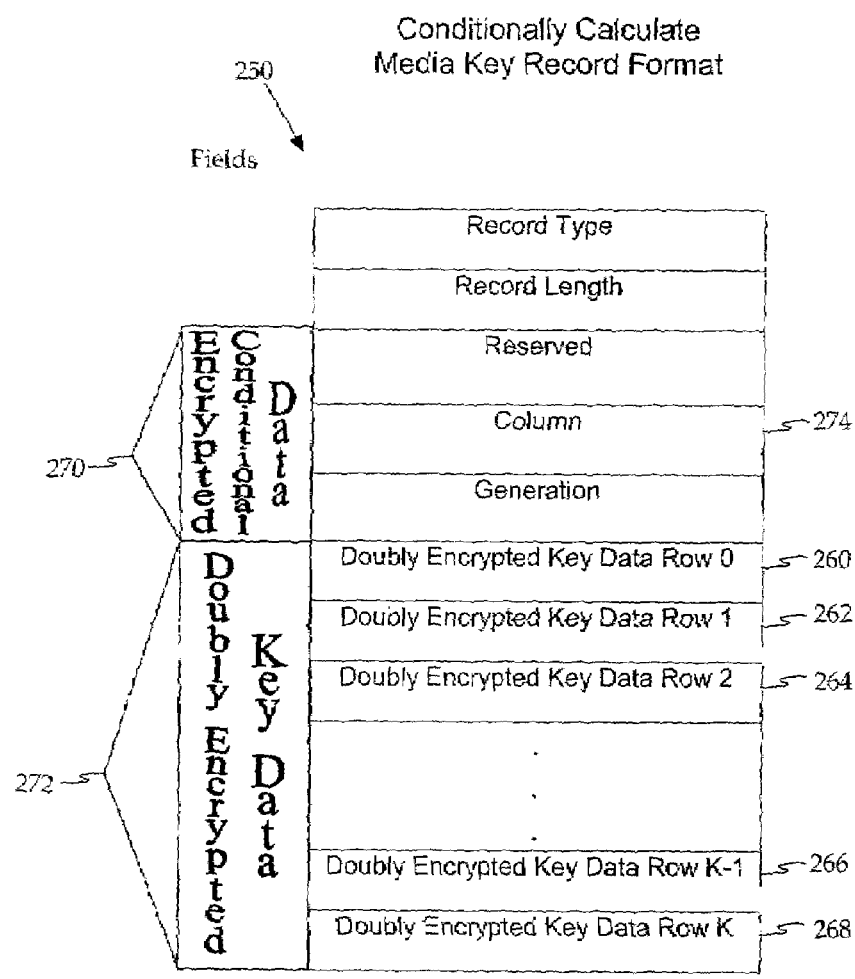
FIG. 2D illustrates one implementation of a Conditionally Calculate Media Key Record within a MKB.
Figure 3A:
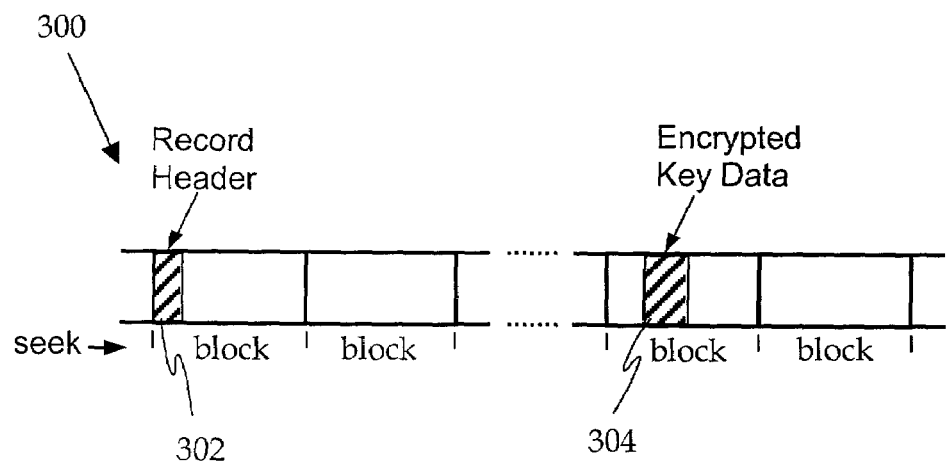
FIG. 3A illustrates accessing a first conventional Media Key Record.
Figure 3B:
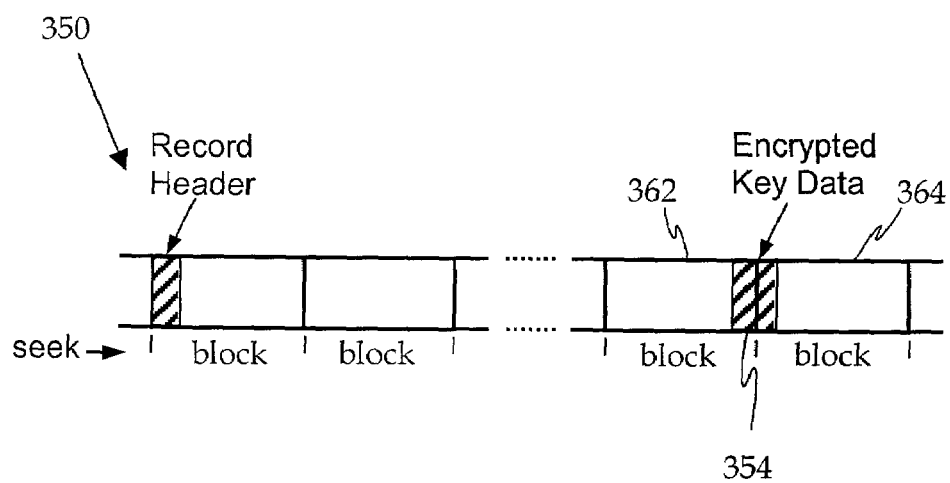
FIG. 3B illustrates accessing a second conventional Media Key Record.
Figure 4A:
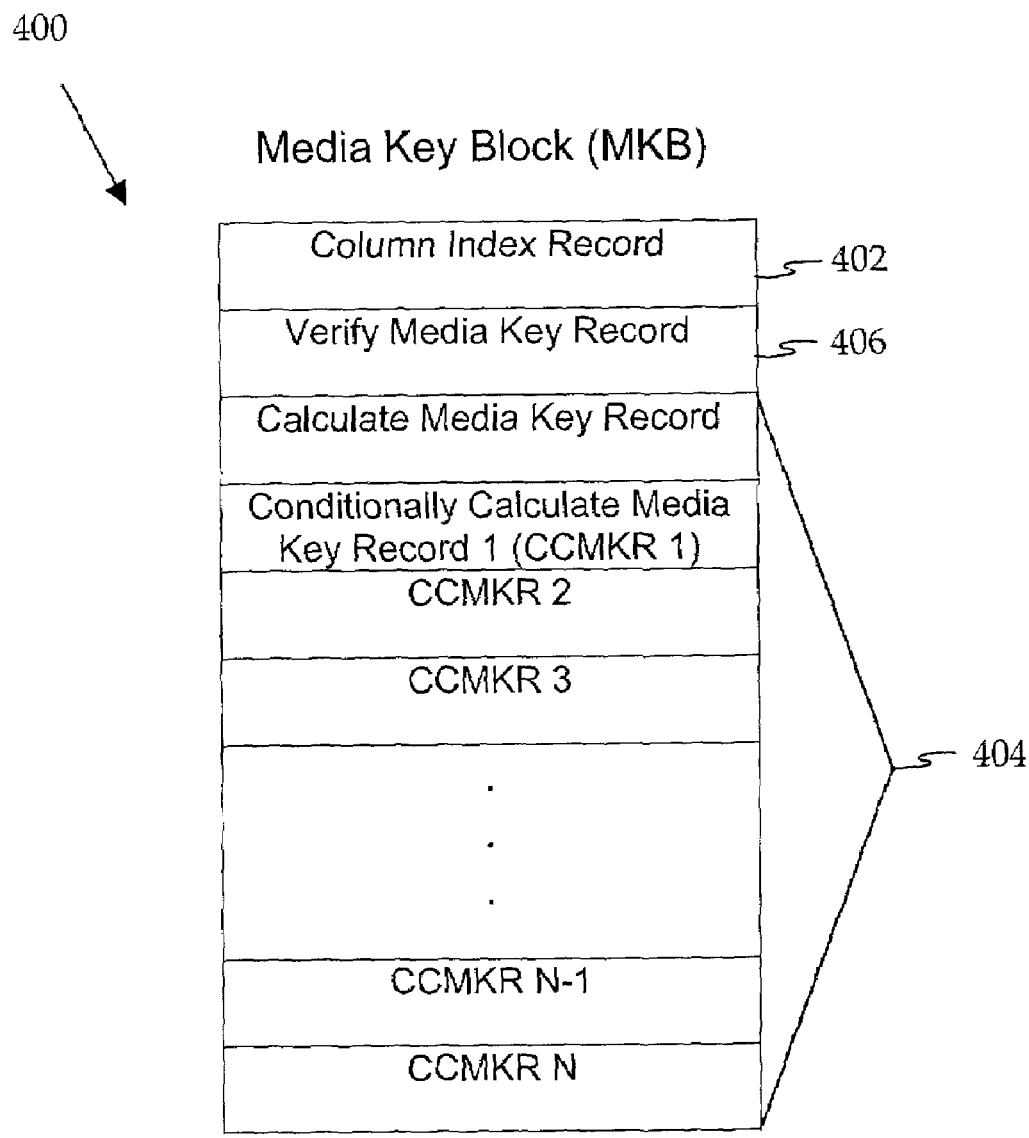
FIG. 4A illustrates a n exemplary embodiment of a Media Key Block as formatted by the present invention.

According to one embodiment of the present invention, illustrated in FIG. 4A, the MKB 400 is formatted so that the header information for all or some of the Media Key Records is placed together in a single new record 402. This new record is hereinafter referred to as the Column Index Record 402.

Figure 4B:
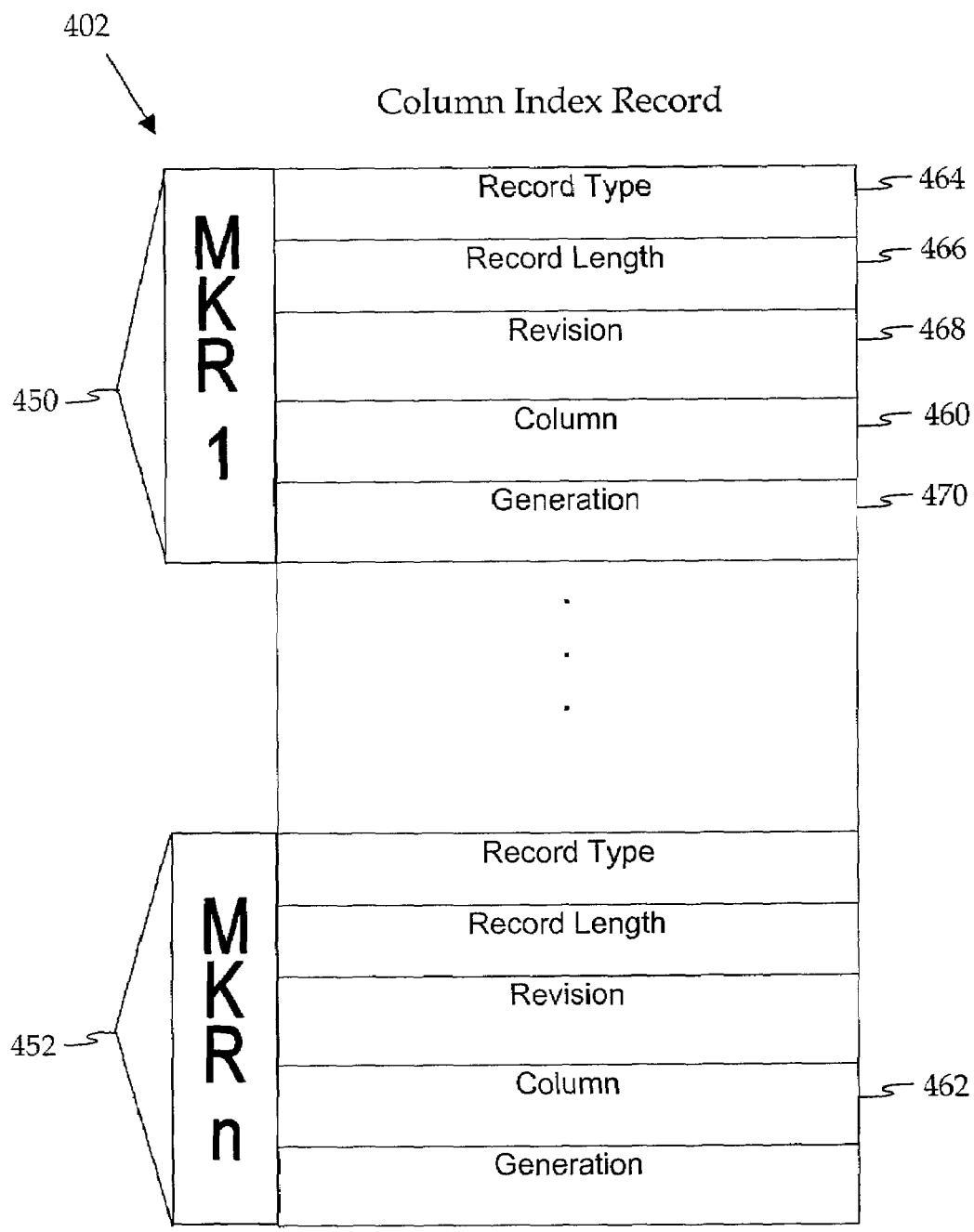
FIG. 4B illustrates an exemplary embodiment of a Column Index Record of the present invention.

As illustrated in FIG. 4B, the Column Index Record 402 may comprise one or more sets of Media Key Record headers 450 and 452. The information contained within each Media Key Record header 450 and 452 may include a Column field 460 and 462 for each record. Although the Record Type 464, Record Length 466, Revision 468, Column 460, and Generation 470 fields are shown in this embodiment, this is not a limitation upon the present invention. In some embodiments of the invention, some of these fields may not be present in the Column Index Record 402. Additionally, the Column Index Record 402 may comprise fields not shown in FIG. 4B.

The Column Index Record 402 may be stored anywhere within or outside the MKB 400. According to one embodiment, the Column Index Record 402 is placed just before the Media Key Records 404 in the MKB 400. In one embodiment, the Column Index Record 402 is placed just before the Verify Media Key Record 406.

Figure 5:
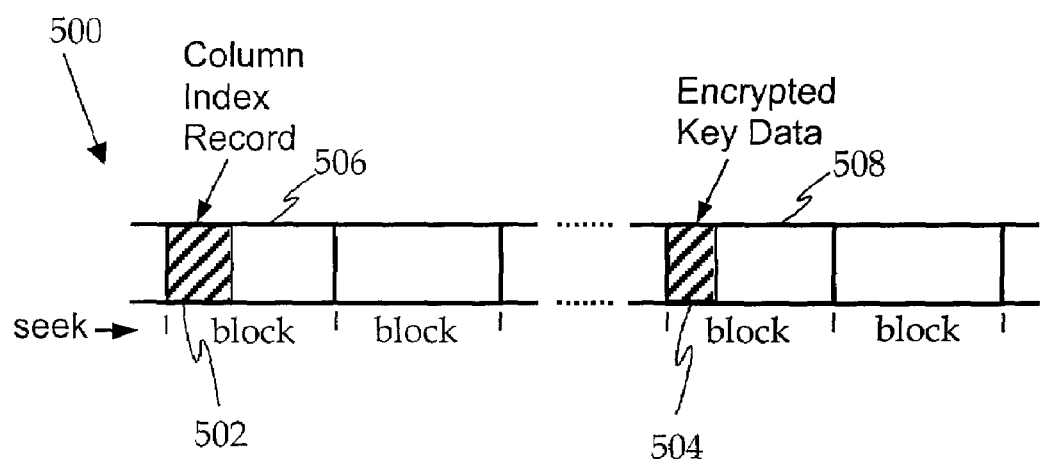
FIG. 5 illustrates accessing the Media Key Record as formatted according to the present invention.

According to one embodiment of the invention, illustrated in FIG. 5, a device processing the newly formatted Media Key Block 400 (FIG. 4A) begins by accessing the Column Index Record 502 using a read operation. Depending on the size of the Column Index Record 502 and transfer unit or block size of the media type, the read operation may be accomplished in a single read operation. In one embodiment, this read operation is not a new requirement since it is already required to read the Verify Media Key Record 406 (FIG. 4A) located at the beginning of the Media Key Block 400. That is, the device may read the Column Index Record 502 and Verify Media Key Record 406, both located within a single transfer unit or block 506 of the physical media type, in a single read operation.

Having read the Column Index Record 502, the device may examine all of the record headers contained therein. According to one embodiment, with each header in the Column Index Record 502, the device may be able to determine, up front, whether it needs to access the Decrypt Key Data fields 504 from the corresponding Media Key Record. Such determination may be made by comparing the associated column value of the Device Key for the device with the Column field 460 (FIG. 4B) of each header. If a match is found, an offset to read the Encrypted Key Data field 504 may be determined by using the associated row value of the Device Key.

Through the use of the Column Index Record 502, which in one embodiment may be read just once, the device may avoid having to seek for and read the header of each Media Key Record. Thus, where two seek and read operations have usually been required to read each Media Key Record, the Column Index Record 502 may enable accessing this same data in fewer operations. In one embodiment, the Column Index Record 502 may permit accessing a Media Key Record in just half as many seek and read operations; that is, one seek and one read operation.

According to one embodiment of this invention, the Media Key Records 404 (FIG. 4A) may have their headers removed. That is, once the Column Index Record 402 (FIG. 4B) contains the Media Key Record headers, the Media Key Records 404 may be reduced in size by removing their headers. In another embodiment, the Media Key Records 404 may contain part or all of their header information.

Additionally, the Media Key Block 400 (FIG. 4A) may be formatted to guarantee that one or more Media Key Records and/or one or more fields of a Media Key Record(s) aligns or fits completely within a single transfer unit or block on a physical media type. For example, as illustrated in FIG. 5, the Encrypted Key Data field 504 may be aligned to fit within a single transfer unit or block 508. Such alignment may be accomplished in a number of ways. In one embodiment, this result may be achieved by modifying the Record Length field as necessary. This may also entail appending bytes to one or more Media Key Records.

By formatting the Media Key Block in this manner a single seek and read operation may be employed where before one seek and two read operations may have been necessary. This alignment technique may be further combined with the new Column Index Record 402 (FIG. 4A) formatting technique described above to achieve faster processing of the Media Key Block 400 (FIG. 4A).

In one implementation, the newly formatted Media Key Block is stored on DVD-compliant media type and comprises 16 columns, with the size of each Encrypted Key Data field being 8 bytes. Accordingly, in one embodiment of the present invention, all of the Media Key Records are adjusted, using the Record Length field, to be multiples of 8 bytes long. This ensures that all of the 8-byte Encrypted Key Data fields fall completely within one media block; each DVD ECC block being 32,768-bytes long.

As an example of the savings in processing time of a Media Key Block that may be achieved by the present invention, consider a simplified example of a DVD player with a 1x-speed reading mechanism, and an estimated worst-case time to read an ECC block of 75 milliseconds (ms), ignoring seek times. This includes approximately 50 ms for rotation of the physical media and an approximate 25 ms transfer time. Using the new format described above, the worst-case total time for all reads needed to process the Media Key Block is 75 ms+16×75 ms=1.3 seconds. That's 75 ms for reading the Column Index Record and Verify Media Key Record (1 rotation & 1 read operation) and 16 columns times 75 ms per Media Key Record Key Data field with no overlapping since the fields are aligned (1 rotation & 1 read operation).

Without the present invention, the worst-case processing time would be 75 ms+16×75 ms+16×100 ms=2.9 seconds. That's 75 ms for reading the Verify Media Key Record (1 rotation & 1 read operation), 16 columns times 75 ms per Media Key Record header (1 rotation & 1 read operation), and 16 columns times 100 ms per Media Key Record Key Data field overlapping two blocks (1 rotation & 2 read operations).

Alignment of the Media Key Records with the block size will vary depending on the media type. While a block size of 32,768 bytes has been used to illustrate the invention on a DVD media, this is not a limitation upon the invention. The concept of aligning the Media Key Record fields within a single block is independent of the block size.

The Column Index Record and/or the Media Key Record alignment techniques, alone or in combination, also enable the use of larger Media Key Blocks than would otherwise be possible. That is, without this invention, as the Media Key Block comprises more Media Key Records, the user-perceptible delays may grow to unacceptable levels. However, as a result of the faster processing that may be achieved by the present invention, larger Media Key Blocks may be employed while minimizing the user-perceptible delay.

One consideration in minimizing the user-perceptible delay is the size and layout of the specific blocks comprising the Media Key Block. For instance, for a typical DVD reader, jumps of over 100 tracks may require a longer linear head seek, whereas jumping less than 100 tracks requires an optical head seek which takes a significantly shorter time. Near the inside of a disk, 100 tracks comprises about 100 tracks×2 blocks/track×32,768 bytes/block=6 Megabytes. Thus, the overall Media Key Block size can be chosen to avoid the longer linear seeks.

Figure 6:
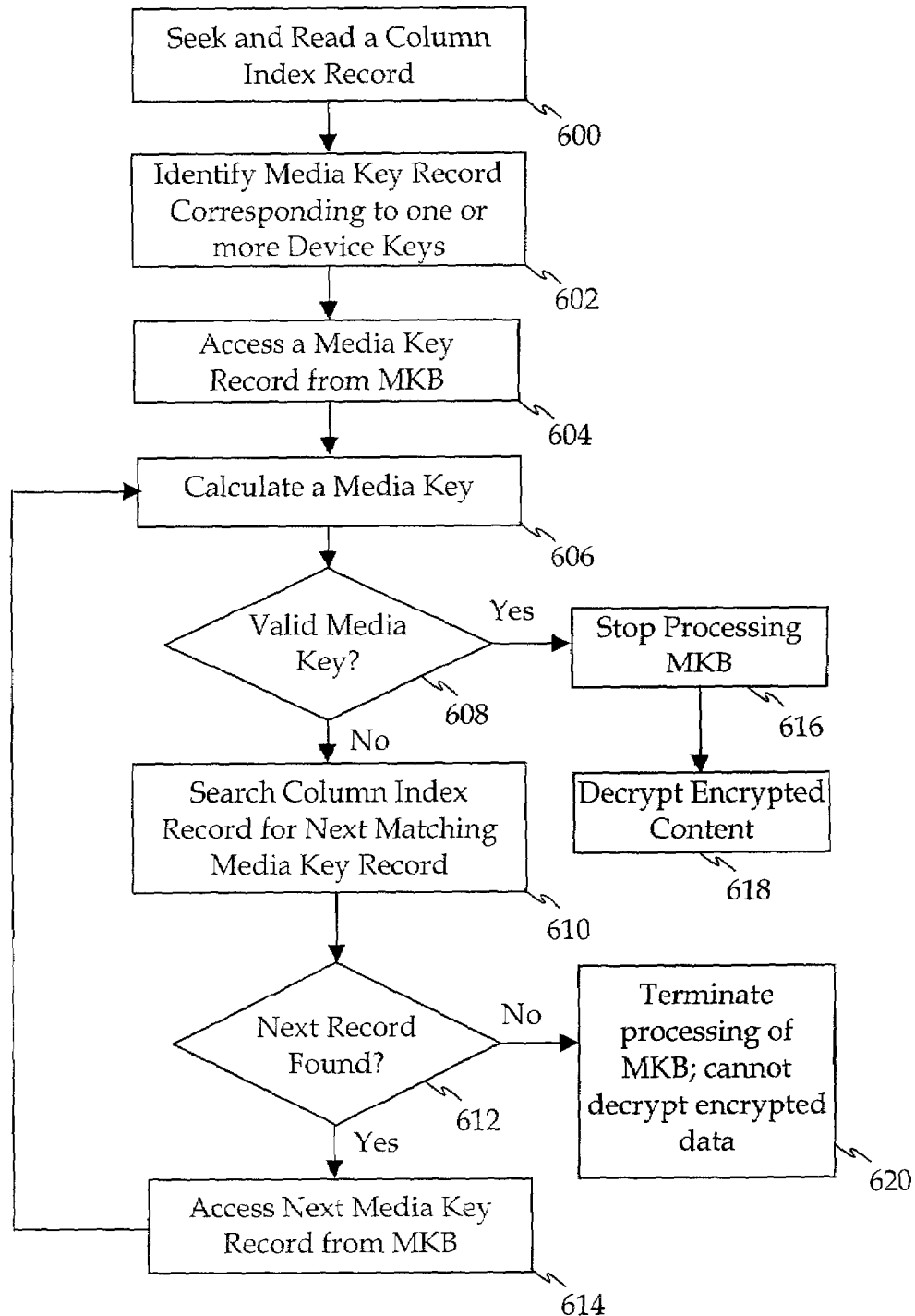
FIG. 6 illustrates a method to process a Media Key Block according to the present invention.

FIG. 6 illustrates one method of processing a Media Key Block according to the present invention. According to one embodiment, a device processing the newly formatted Media Key Block would seek for the Column Index Record on any given media, and read it 600. The terms "seek" and "read" are used herein to describe seek and read operations on a particular media type which may hold part or all of the Media Key Records. According to one embodiment, the device may store the Column Index Record in memory for later access. Using the Column Index Record, the device may search for a Media Key Record header which matches one of its Device Keys 602. In one embodiment of the invention, this step may entail matching the Column field of a Media Key Record header to the column number associated with one or more of its Device Keys. Note that in one embodiment, a device may always have at least one Device Key that matches the Calculate Media Key Record.

Once a particular Media Key Record has been identified, the device may then seek and read the Media Key Record 604. In one embodiment, the device may access only the Encrypted Key Data field corresponding to the row number associated with the Device Key. The device may index into this field by using the row number and known size of the fields to calculate an indexing point.

Once the device has obtained the Encrypted Key Data field, it may then calculate a Media Key 606 using the Encrypted Key Data and its Device Key. It may then check whether the Media Key is valid 608 by using the verifying algorithm in the Verify Media Key Record which it may have been read at the same time as the Column Index Record. If a valid Media Key is found, then the device may stop processing the Media Key Block 616, and use the Media Key to decrypt encrypted content 618.

If the Media Key is not valid 608, then the device may search the Column Index Record for the next Media Key Record header which corresponds to one or more of its Device Keys 610. If such record is found 612, the device may then seek and read the Media Key Record 614. According to one embodiment, the device may only seek and read the Encrypted Key Data field for the Media Key Record of interest. The device may then proceed to calculate a Media Key 614 as before. This process may be repeated until a valid Media Key is found or no more Media Key Records are available.

If no corresponding Media Key Record is found or no more Media Key Records are available, then the device may terminate processing of the MKB 620. In one embodiment, failure to obtain a valid Media Key may prevent a device from being able to decrypt the encrypted data.

The present invention may also be embodied in a signal carrying instructions to process the Media Key Block as described above. Additionally, the present invention may be embodied in a machine-readable medium, in the form of instructions to carry out the steps described above.

Figure 7:
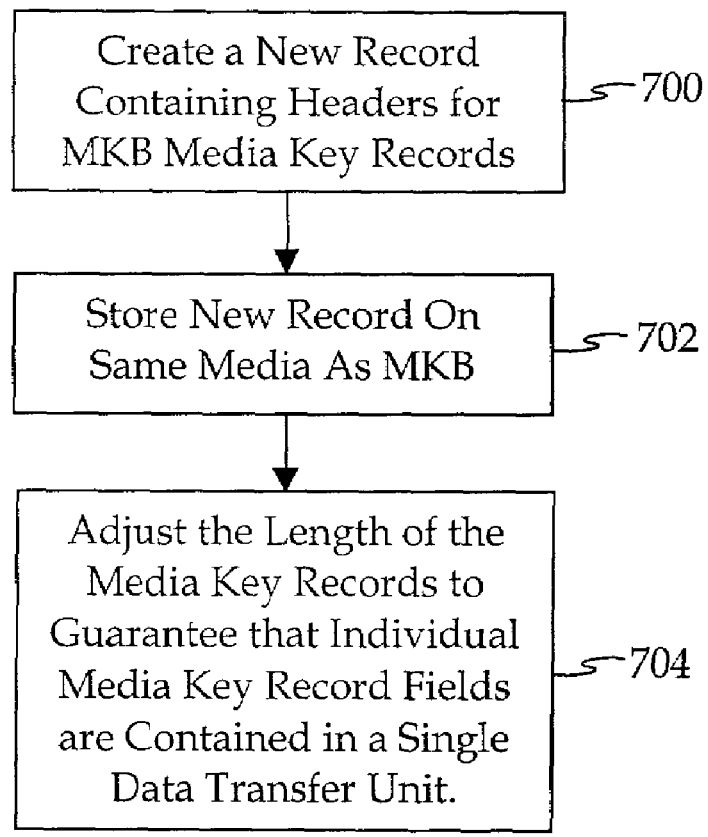
FIG. 7 illustrates one way to format a Media Key Block according to the present invention.

FIG. 7 illustrates one process of formatting a Media Key Block according the present invention. Generally, a conventional Media Key Block may be parsed to collect header information for its Media Key Records. The header information for the Media Key Records is arranged in a new record 700. The new record may be stored or recorded onto the same media as the Media Key Block 702. Additionally, one or more Media Key Records and/or one or more fields of a Media Key Record in the Media Key Block may be adjusted to fit within a single transfer unit or block 704. According to one embodiment, the Record Length field may be adjusted to guarantee that the record fits within a single block. In another embodiment, this adjustment may comprise appending additional bits to the record or to a field within the record.

The present invention may be embodied in a device, system, computer, media, and/or software program. Additionally, the invention may also be practiced by transmitting to a device one or more Device Keys, the newly formatted Media Key Block, including the Column Index Record, and the encrypted content. This transmission may take place over the airwaves.

Additionally, while the invention has been described with reference to a Media Key Block and its associated components, it should be clearly understood that the present invention may be practiced on other types of applications.

While the invention has been described and illustrated in detail, it is to be clearly understood that this is intended by way of illustration and example only and is not to be taken by way of limitation, the spirit and scope of this invention being limited only by the terms of the following claims.

What is claimed is:

1. A method comprising:
    formatting a media key block to include a column index record; and
    recording the media key block to a machine accessible medium;
    wherein the column index record comprises header information for two or more media key records;
    wherein the header information comprises column fields for two or more media key records; and
    wherein the column index record comprises two or more column fields.

2. A method according to claim 1, further comprising:
    formatting the media key block to include both the column index record and a verify media key record within a single data transfer unit of the machine accessible medium.

3. A method according to claim 2, wherein the single data transfer unit comprises an error control code (ECC) block.

4. A method according to claim 1, wherein the operation of formatting a media key block to include a column index record comprises:
    including two or more record length fields in the column index record.

5. A method according to claim 1, wherein the operation of formatting a media key block to include a column index record comprises:
    including two or more column fields and two or more record length fields in the column index record.

6. A method according to claim 1, wherein the machine accessible medium comprises a digital versatile disk (DVD)-compliant medium.

7. A method according to claim 1, wherein the operation of formatting the media key block to include a column index record comprises:
    arranging the column index record before a verify media key record in the media key block.

8. A method according to claim 1, further comprising:
    appending sufficient filler bytes to a first media key record within the media key block to cause an encrypted key data field of a subsequent media key record to be positioned completely within a single data transfer unit of the machine accessible medium.

9. A method according to claim 8, further comprising:
    modifying a record length field of the first media key record, to account for the appended filler bytes.

10. A method according to claim 8, wherein the subsequent media key record with the encrypted key data field to be positioned completely within the single data transfer unit comprises a calculate media key record (CMKR).

11. A method according to claim 8, wherein the subsequent media key record with the encrypted key data field to be positioned completely within the single data transfer unit comprises a conditionally calculate media key record (CC-MKR).

12. A method, comprising:
    reading a column index record from media key block stored on a machine accessible medium, wherein the column index record comprises header information for two or more media key records, the header information comprises column fields for two or more media key records, and the column index record comprises two or more column fields; and
    determining which of the two or more media key records should be accessed, based at least in part on the column fields in the column index record for the two or more media key records.

13. A method according to claim 12, further comprising:
    accessing one or more of the media key records, based on the determination of which media key record should be accessed; and
    calculating a media key, based at least in part on information obtained from the accessed media key record.

14. A method according to claim 12, further comprising:
    accessing one or more of the media key records, based on the determination of which media key record should be accessed, wherein the operation of accessing one or more of the media key records is performed by a device having a predetermined column value; and
    wherein the operation of accessing one or more of the media key records comprises accessing media key records that include encrypted key data fields only if those media key records comprise a column value that corresponds to the predetermined column value for the device.

15. An apparatus comprising:
    a storage medium; and
    instructions encoded in the storage medium, wherein the instructions, when executed by a device, cause the device to perform operations comprising:
    reading a column index record from media key block stored on a machine accessible medium, wherein the column index record comprises header information for two or more media key records, the header information comprises column fields for two or more media key records, and the column index record comprises two or more column fields; and
    determining which of the two or more media key records should be accessed, based at least in part on the column fields in the column index record for the two or more media key records.

16. An apparatus according to claim 15, wherein the operations further comprise:
    accessing one or more of the media key records, based on the determination of which media key record should be accessed; and
    calculating a media key, based at least in part on information obtained from the accessed media key record.

17. An apparatus according to claim 15, wherein the operations further comprise:

accessing one or more of the media key records, based on the determination of which media key record should be accessed;

wherein the device that performs the operation of accessing one or more of the media key records has a predetermined column value; and wherein the operation of accessing one or more of the media key records comprises accessing media key records that include encrypted key data fields only if those media key records comprise a column value that corresponds to the predetermined column value for the device.

18. An apparatus according to claim 17, wherein the device calculates a media key after accessing one or more media key records with a column value that corresponds to the predetermined column value for the device.

19. An apparatus according to claim 15, wherein the apparatus comprises a data processing system.

20. An apparatus comprising;
a machine accessible medium;
a media key block, including multiple media key records, recorded in the machine accessible medium; and
a column index record within the media key block;
wherein the column index record comprises header information for two or more of the media key records;
wherein the header information comprises column fields for two or more of the media key records; and
wherein the column index record comprises two or more column fields.

21. An apparatus according to claim 20, wherein:
the media key block comprises the column index record and a verify media key record, with both the column index record and the verify media key record stored within a single data transfer unit of the machine accessible medium.

22. An apparatus according to claim 20, wherein:
the media key block comprises multiple media key records with encrypted key data fields; and
each encrypted key data field resides completely within a single data transfer unit of the machine accessible medium.

23. An apparatus according to claim 20, wherein the column index record comprises two or more record length fields.

24. An apparatus according to claim 20, wherein the machine accessible medium comprises a digital versatile disk (DVD)-compliant medium.

25. An apparatus according to claim 20, wherein the column index record precedes a verify media key record in the media key block.

26. An apparatus according to claim 20, wherein:
the machine accessible medium further comprises encrypted content; and
at least one of the media key records comprises data that may be used to calculate a media key for decrypting the encrypted content.

* * * * *